United States Patent [19]
Anderson et al.

[11] 3,811,168
[45] May 21, 1974

[54] POSITIVE LOCKING CONTACT INSERTION AND TESTING TOOL

[75] Inventors: James D. Anderson, Norwalk; Ernest L. Cheh, Darien, both of Conn.

[73] Assignee: Burndy Corporation, Norwalk, Conn.

[22] Filed: Dec. 29, 1972

[21] Appl. No.: 319,148

[52] U.S. Cl. .............................................. 29/203 H
[51] Int. Cl. ............................................... H01r 43/00
[58] Field of Search..... 29/203 H, 203 HC, 203 HT, 29/200 H

[56] References Cited
UNITED STATES PATENTS
3,605,234  9/1971  Bogursky ........................ 29/203 H

*Primary Examiner*—Thomas H. Eager
*Attorney, Agent, or Firm*—Howard S. Reiter

[57] ABSTRACT

A tool for inserting a contact into a connector and for testing if the insertion is successful. The tool has first and second holding devices. The first holding device is active to test if the insertion of the contact into the connector is successful. The second holding member is for inserting the contact into the connector. A positive locking device is provided so that an operator cannot unintentionally release the first holding device, thereby insuring that the proper testing procedure is followed on each test cycle. The positive locking function results from forming keyways and keys on the first holding device and the positive locking device which interact to prevent release of the first holding device until a predetermined stress level is reached. The yielding stress level is maintained by a resilient device acting on the first holding device which releases a gripped object at an appropriate stress level. A gate device limits entry to the first holding device to insure the integrity of the testing cycle.

10 Claims, 9 Drawing Figures

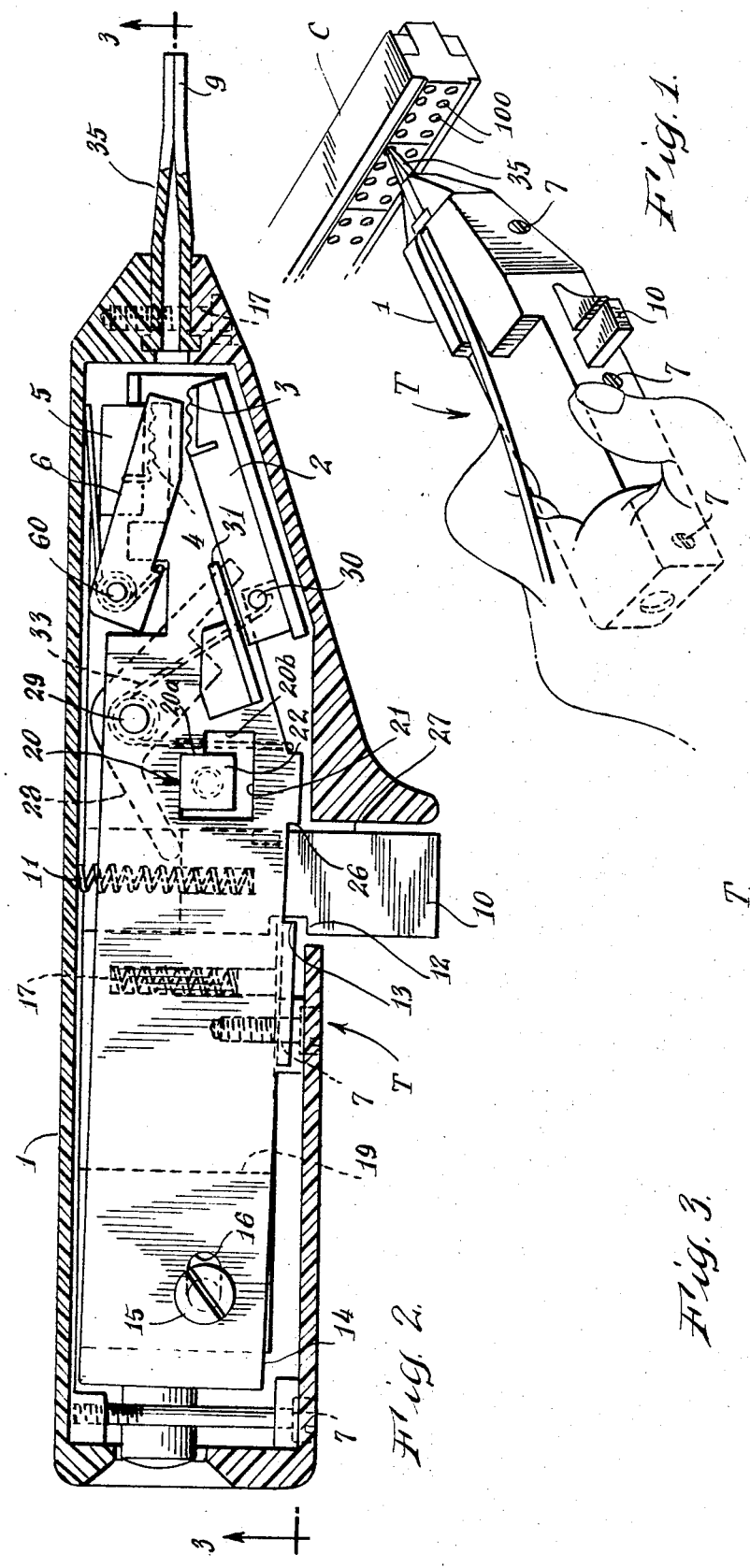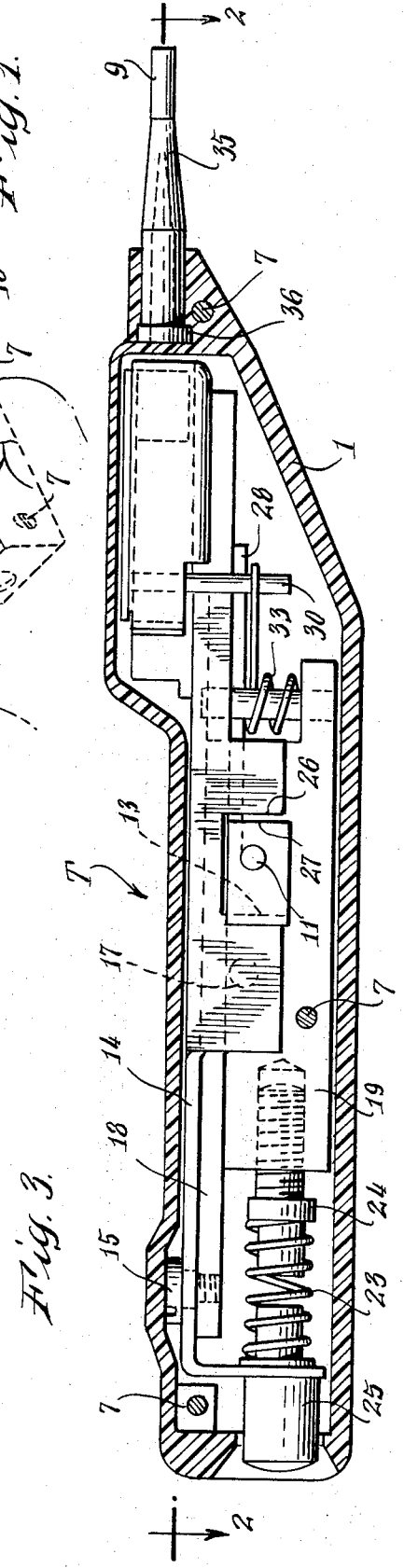

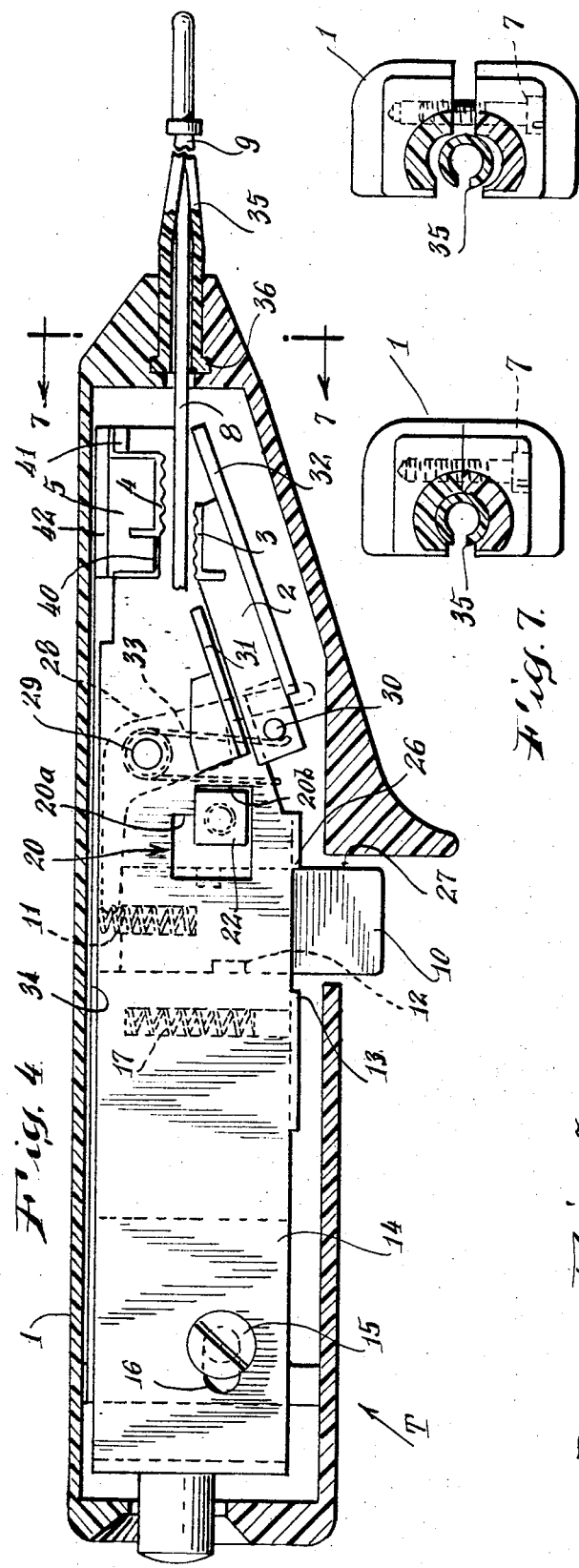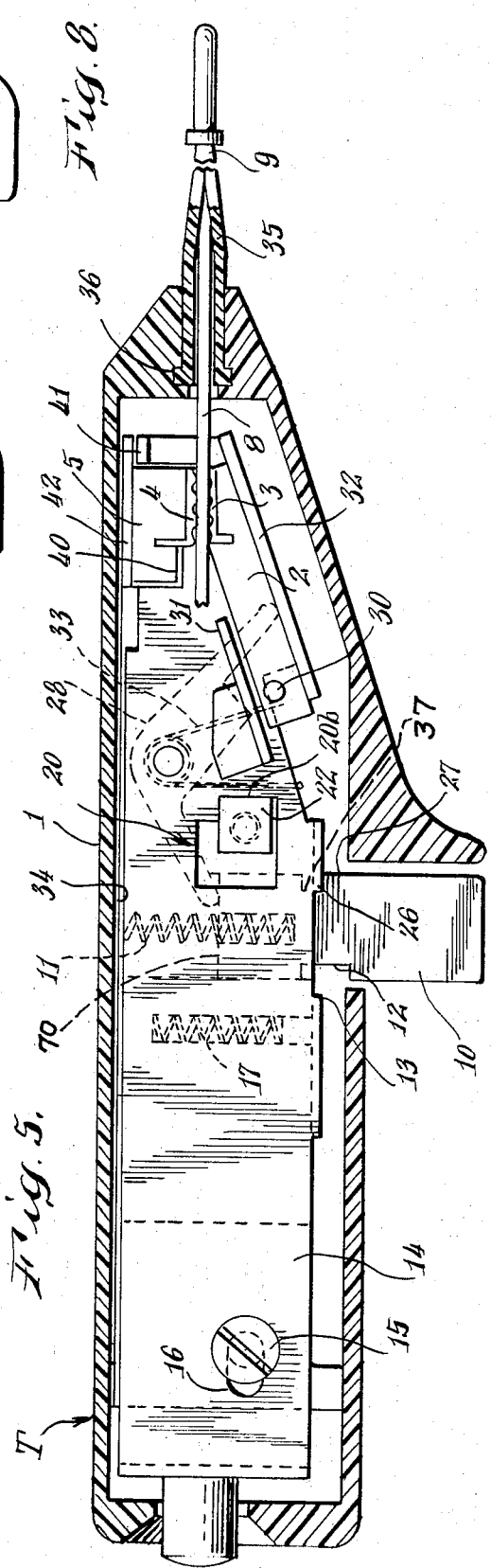

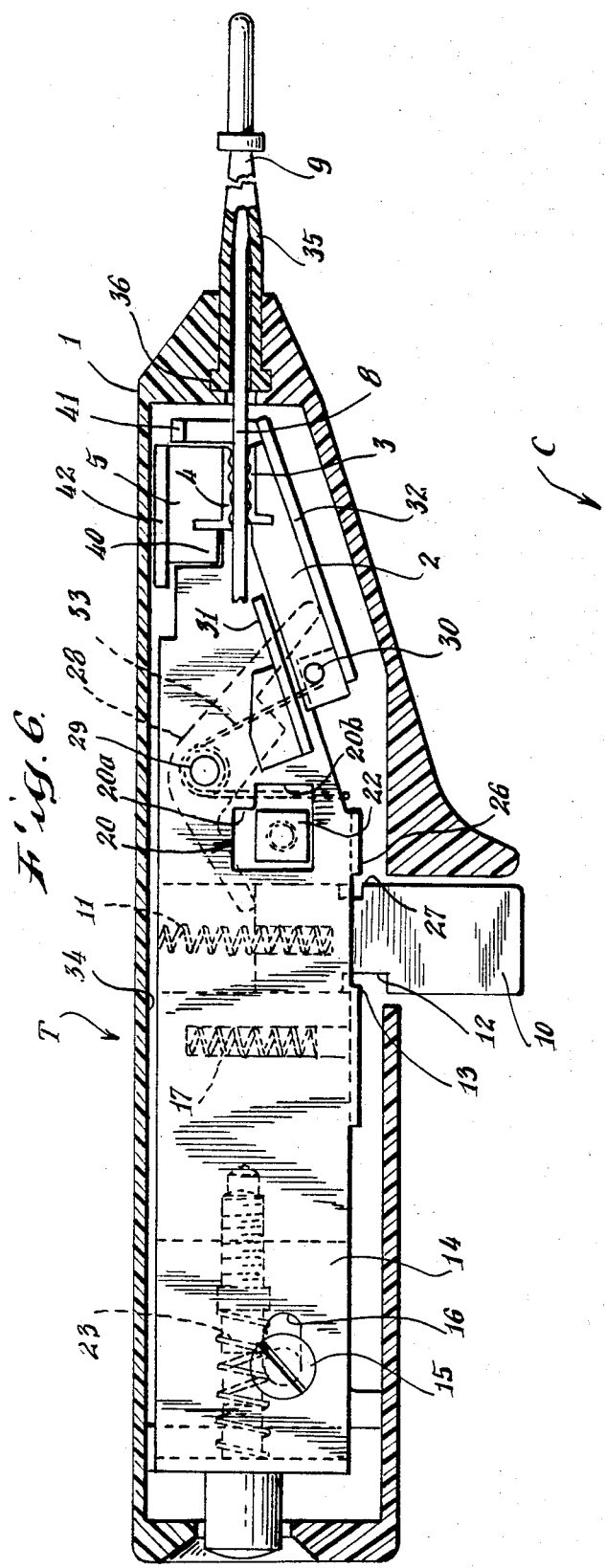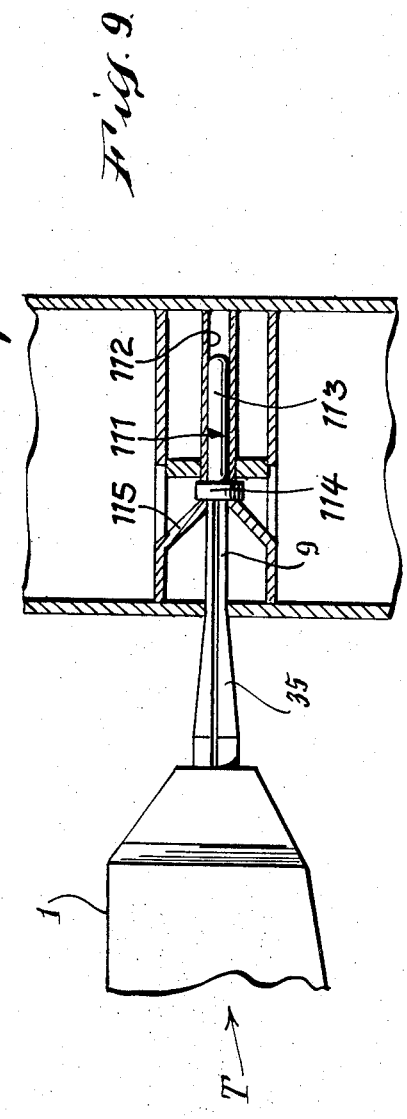

POSITIVE LOCKING CONTACT INSERTION AND TESTING TOOL

BACKGROUND OF THE INVENTION

This invention relates to a tool for inserting a terminated contact into a connector body and for testing whether or not the contact has been effectively inserted into the connector body.

Tools for inserting a wired contact into a connector body are old in the art. U.S. Pat. No. 3,605,234 issued in the name of Robert M. Bogursky on Sept. 20, 1971, and assigned to the assignor of the present invention appears to be relevant prior art. That patent teaches a contact insertion and testing tool in which a predetermined travel of a gripper relative to a tool body was required to test the effectiveness of the contact thought to be inserted.

While the Bogursky patent does represent a considerable advancement in the art of a tool for contact insertion and testing, several improvements upon it became desirable.

The improvements became desirable because the tool and its component parts are expensive to manufacture. Operator fatigue using the device taught by the Bogursky patent was significant because the operator was required for most of the insertion cycle to keep his thumb and forefinger on two buttons which are resiliently biased against operator effort. Because the operator's thumb and forefingers are on the activating buttons taught in the Bogursky patent, there is a tendency for the operator to release the contact prematurely during the test cycle. This effect may result in the operator making a number of inadequate tests during any period of time of contact insertion.

When the operator was engaged in using the device taught in the Bogursky patent, he experienced some difficulty in getting only one wire into the gripper mechanism for each cycle.

The device taught in the Bogursky patent required a relatively large amount of space within which to operate. The space was required because the insertion tips and grippers pivoted about on axis generally centrally located within the tool causing the tips and grippers to have the greatest separation at their own extremities. Unfortunately, the point of greatest opening occurs where the connector body is crowded with bundles of contacts and wires either in place in the connector or waiting to be placed into the connector. In practice, an operator using the Bogursky device had to exercise considerable care to select only one contact at a time for insertion into the connector to avoid entanglements with other wires and contacts. Such entanglements could easily result in broken wires or broken insulation or both. These events could act to prevent the failure of a large and expensive system. If more than one wire were inserted into the device for each test cycle the test performed would not be an adequate one and could result in a poor or non-existent electrical connection between contact and connector.

The Bogursky patent taught an insertion tip which was rigid. The tip frequently fractured and since it was not easily replaced and it was relatively expensive, as a result that failure was economically costly in time and materials.

Therefore, while the Bogursky patent represented a significant advance in the state of the art, it had problems which the present invention has solved.

SUMMARY OF THE INVENTION

The present invention solves all of the problems present in the prior art.

In the present invention the insertion tips and the holders are not pivoted about the central axis located within the tool, but have virtually no motion in the direction of insertion or removal. All action is tangential to the path used in inserting and testing contact with the connector. Because there is little motion in the direction of insertion and testing, the device taught in the present invention is capable of reaching into spaces which are more confined and to connectors which are smaller with contacts which are smaller.

The insertion tip taught in the present invention is designed to be readily removable from the hand tool body and is made of a low strength plastic material.

The device taught in the present invention operates so that the person inserting the contact into the connector is prevented from interfering with the force applied to the contact during the testing cycle. This action is achieved by an automatic locking device which locks the holders into the contact wire until the test force is applied. The present invention teaches a release mechanism located at the base of the tool to be used only consciously by the operator to release the contact and never to be released by the operator inadvertently.

The present invention teaches a gripping surface separate from but closely placed to the locking device actuator so that operator fatigue is reduced as compared to the prior art.

The present invention teaches a gate device deployed in front of the holding device so that the integrity of the testing cycle is insured. This action virtually eliminates the possibility of having an operator inadvertantly bypass the testing cycle and thereby prevents an inadequate test of the insertion of the contact into the connector body.

The insertion tip taught in the present invention is designed to limit the number of wire and contacts to be placed within it at one time.

It is an object of the present invention to provide an insertion tool for inserting contacts into connector bodies which can operate successfully in much smaller spaces with smaller gauge wires, contacts and connector bodies than previously known.

It is an object of the present invention to provide a hand tool for inserting contacts into connector bodies in which the operator is not able to unintentionally provide a test which is less than a designed test.

It is an object of the present invention to provide a hand tool for inserting contacts into connector bodies in which operator fatigue is reduced.

It is an object of the present invention to provide a hand tool for inserting contacts into connector bodies in which adjustment of the test force requires disassembly of the tool.

BRIEF DESCRIPTION OF THE DRAWING

Referring now to the drawings,

FIG. 1 is a view in isometric perspective showing the utilization of tool for inserting a wired contact into a connector body.

FIG. 2 is a plan view of FIG. 1.

FIG. 3 is a section taken along line 2-2 of FIG. 2.

FIGS. 4, 5 and 6 are all taken along the same section lines as FIG. 3 (that is, lines 2—2 shown in FIG. 2) showing several of the parts of my invention in order to better indicate their interaction.

FIGS. 7 and 8 show the insertion of the holding tip into the hand tool in section 7—7 of FIG. 6.

FIG. 9 is a section view of a connector body showing its working parts with a contact inserted into the connector body.

DESCRIPTION OF THE INVENTION

Referring now to the drawings, the connector body to which the contact elements are to be inserted by the use of my tool is designated by reference letter C and is well shown in FIG. 1. It is formed usually of plastic material with a series of openings 100 into each of which a wired contact element is to be inserted. The openings 100 are also well illustrated in FIG. 9 where a contact element generally designated by reference numeral 111 is shown effectively inserted into one opening. Referring to FIG. 9, we see that the connector body C has a conducting socket 112 therewith adapted for each contact element 111. It will be noted in this figure that a part 113 of the contact element 111 is within the socket 112, while a shoulder 114 of the contact element rests against the forward wall of the socket, and naturally limits the insertion of the contact into the socket.

It will also be noted that the shoulder 114 lies just beyond the end of a springlike detent finger 115 formed by a part of the connector body. As those skilled in the art will appreciate, the insertion of the contact 111 into the connector body will first act to cam the detent finger 115 out of the holding position shown in FIG. 9, after which detent 115 will spring back into holding position, and will prevent the outward movement of the contact by coaction with the shoulder 114 all as is well illustrated. Naturally, there may be a plurality of fingers 115.

Actually, removal of the contact element thereafter can only be secured through the use of a tool which cams the spring detent fingers 115 beyond the shoulder 114. The construction of the connector body C, and the construction of a contact 111 and its method of retention by the spring detents 115, is all standard in the art and is well understood, and is merely described briefly here in order to better outline the invention and to show its relation to the prior art.

It should be understood, however, that unless a contact element 111 is inserted into the connector body into the position illustrated in FIG. 9, the shoulder 114 will not have moved beyond the spring detent fingers 115, and the contact element will not be fully inserted into position for effective operation. It is the purpose of my tool to apply outward pull to a contact element 111, after its insertion into a connector body so that unless it has been fully locked in position within the connector body as illustrated in FIG. 9, it will be moved outwardly. While such tools have been previously taught in the prior art, my invention achieves a new reliability of the security of the contact within the connector body and is easier to use for a number of reasons which have been described.

Referring more particularly to FIGS. 1 to 8, the body of the tool of my invention is indicated generally indicated by the reference letter T. Turning now to FIG. 2 which shows a view of my invention with the upper portion of the cover 1 removed. The tool is in the position it will be in following a complete insertion cycle. The first holding device having an upper gripping member 3 and a lower gripping member 4 are in an open position. A gate member 6 is shown in partial view closed so as to prevent the accidental failure of an operator to test if the contact is locked into the connector. The gate member 6 is pivoted about a pin member 60 and biased by spring member 61 to close once during each test cycle.

FIG. 3 is a view taken along the lines 3—3 shown in FIG. 2 which a portion of cover 1 is removed. FIG. 4 shows the tool as shown in FIG. 3 having been made ready to receive another wire W and its contact 111 by depressing and holding depressed actuating locking button 10. Actuating button 10 causes the following series of motions.

Resilient member 11 shows as a coil spring acting between cover 1 and biasing button 10 outwardly against the operator is compressed. A first rotating and translating plate member 14 which is pivoted by actuating button 10 which has a cam surface 12 formed thereon. Cam surface 12 coacts against a first cam surface 13 formed on the plate 14 which will cause the plate 14 to pivot about the screw member 15.

As the plate 14 pivots the resilient element 17 shown as a coil spring biasing the plate 14 away from block body member 19 is compressed. As plate 14 pivots its second cam surface 20b formed in keyway 20 moves past a corresponding key member 22 which is fixed to plate 18.

When first cam 20 passes key 22 the rotating and translating plate 14 moves away from the insertion tip holder 35 under the action of resilient element 23, shown as a coil spring, which is acting between an adjustment screw 24 inserted into block member 19 and cam locking release button 25 contained within plate 14.

Plate 14 moves under the action of spring 23 until its second cam surface 26 contacts a second cam surface 27 of button 10 thereby limiting further movement of plate 14.

At the same time that plate 14 is moving under action of spring 23, the first cam surface 12 of the operating button clears the edge of surface 13 to prevent further pivoting motion of plate 14 about screw 15.

Plate 14 is thus held fixedly cammed between its cam surfaces 20b in keyway 20 against key 22 as driven by the force of spring 17. As button 10 continues to be moved to the direction of compressing spring 11, its lower cam surface 70 actuates pivoted arm 28 which is acting about pin 29 fixed in block member 19. As arm 28 pivots, it acts against pin 30 firmly affixed to lower holding member 2 causing that member to move angularly within guide elements 31 and 32 which are affixed to plate 14. This motion of holder 2 and its pin 30 compresses spring 33 acting between pin 30 and body member 19.

Actuating button 10 is prevented from further motion against spring 11 by its surface 70 striking cover 1. The position of the component parts of my invention is now as shown in FIG. 4.

The tool is now ready to receive a wire W terminated with a contact 111. A fracturable plastic insertion tip 35 which is tapered in a C cross-section has a flanged end 36 which is held within a matching surface 35a formed for the forward end of the cover 1 and is confined by a screw 7 as shown in FIGS. 7 and 8 in the loosened and tightened positions respectively.

Flattening a side of flanged end 36 provides restraint against rotation of tip 36. The plastic tip number 35 is formed such that it will break prior to any damage being done to the connector body.

The wire W is placed between the insertion tip of holder 35 until the shoulder 114 of the contact member 111 is snugly against the forward end of the holder 35 and the portion of the wire extending rearward from insertion member 35 is placed between the first holder members 2 and 5. When actuating button 10 is released it is driven away from cover 1 by the action of spring 11. This outward movement of button 10 brings about the following motions. Pivoted arm number 28 is pivoted by the force of spring 33 acting on pin 30. Holder 2 moves the direction of insertion tip 35 under the force of spring 33 until gripping surfaces 3 and 4 on the respective holding members grip wire W. Button 10, continuing its motion away from cover 1, has third cam member 37 clearing past second keyway surface 26 of plate 14 permitting plate 14 to move under the action of spring 23 away from insertion holder 35. Plate members 14 motion away from tip member 35, is completed when fourth cam surface 38 abuts key 22.

Actuating button 10 is now at the end of its travel away from cover 1, with a keyway surface 26 locked inside cam surface 37 of button 10 preventing any action of button 10 tending to compress spring 11. Thus, a locking mechanism prevents release of wire W from the gripping surfaces 3 and 4.

The parts of the tool are as in position as shown in FIG. 5 and the tool is ready for the insertion of the contact into its connector. During this insertion, the compressive force against contact 111 is taken by insertion tip 35 acting against cover 1 and no force is applied to any of the locking and releasing mechanisms of the tool.

After the connector has received the contact 111, the operator pulls on the tool in the direction tending to remove the contact 111 from the connector C. A gripping member 39 is placed adjacent to button 10 to receive that stress and to prevent any action against button 10. From an operator's point of view, it is a very simple manouver to operate holder member 39, whereas in the prior art devices, the operator had to release his grip and slide further down the tool or operate against the actuating buttons which tended to release the wire and not properly test the contact made between the element 111 and the connector C.

If contact is not properly made between the connector and the contact member, the tool will remove contact element 111 from the connector C. If the contact is properly made, the pull on the tool through member 39 is transmitted through the wire W to the holder members 2 and 5.

Turning now to FIG. 5 which best illustrates the action of the component parts during the test cycle, holder element 5 is held within a guideway defined by surfaces 50 and 41 of plate 14 and the surface of 42 of plate 18. Holder member 5 is therefore able to move to the direction of holder member 35 if plate 14 can move in the same direction. Holder 2 is snugly held by slide guides 31 and 32 so that it is locked against plate 14 and wire W. It can be seen that a pulling action in the direction of tip member 35 against holder elements 2 and 5 is transmitted to plate 14. When that tensile pull on translating and rotating plate 14 exceeds the force exerted by sprng 23, plate 14 moves in the direction of holder 35 until cam surface 20a clears key 22 releasing plate 14 freely to pivot about screw 15 which it does because of the action of spring 17 until it is stopped by second cam surface 20b formed in that keyway 20. In this action, plate 14 moves in the direction compelled by spring 17 and holder 2 moves in a direction toward tip 35 and thereby releases its grip on wire W.

The force at which the release of the holder jaws occurs can easily be set by turning adjustment screw 24, to increase or decrease its extension from block 19 and thus to change the compressive force stored in spring 23. Using a force measurement device screw 24 can be accurately set to allow the trigger release of the holder at a desired force.

If, or some reason, actuating button 10 is depressed accidentally and the holder is set in a locked position with or without a wire in place, a release device 25 is available to release the locking action of the tool.

A force applied to button member 25 is transmitted directly to rotating and translating plate 14 and along with the co-action of spring 17 moves the cam surface 20 past the key 22 and releases the holders. Release device 25 is recessed within the cover so as not to be used readily by the operator of the tool during normal cycles. Release 25 is recessed also to prevent inadvertent release of the holder.

It can be easily seen that the present invention accomplishes all of its stated objectives and achieves improvements over the prior art devices.

We claim:

1. In a tool of the class described: a tool body; first holding means including a pair of grippers mounted to said tool body movably relative to each other for yieldably holding and transmitting test forces to an object to be inserted and tested; first resilient means including a gripping spring element for biasing said grippers together to yieldably hold an object; second resilient means mounted in said tool body including a testing spring element and a cam element permitting separation of said grippers to release an object held thereby upon transmittal of a force from said object through said grippers which is sufficient to overcome the resistance of said testing spring; and locking means preventing movement of said grippers prior to overcoming the resistance of said testing spring.

2. The tool claimed in claim 1 including further:
   release means for unlocking the locking means located on said tool body spatially distant from said locking means.

3. The tool claimed in claim 1 including further:
   gate means automatically preventing access to said first holding means at the end of each test cycle.

4. The tool claimed in claim 1 including further: second holding means removably attached to said body including a holder member for supporting an object in proper position relative to said tool body for insertion and testing.

5. The tool claimed in claim 1 including further:
   adjustment means for said second resilient means enclosed within said tool body.

6. The tool claimed in claim 1 including further:
   gripping means fixed to said tool body adjacent said locking means.

7. The tool claimed in claim 1 wherein:

said locking means has a first sliding member having first and second actuating surfaces.

8. The tool claimed in claim 7 wherein:

said first holding means has a first rotatable and translatable member having a keyway with first and second formed cam surfaces therein; and, said locking means has a first key member for engaging said first and second cam surfaces.

9. The tool claimed in claim 8 wherein:

said first resilient means has a first spring member bearing said first holding means toward contact with said object; and, said first spring member operable to drive said first holding means into a locked position with said locking means keyway and said locking means first sliding member.

10. The tool claimed in claim 9 wherein:

said first holding means first rotatable and translatable member has a resilient member biasing said first and second cam surfaces in the direction of the said locking means first key member.

* * * * *